(12) United States Patent
Hirao et al.

(10) Patent No.: US 8,598,250 B2
(45) Date of Patent: *Dec. 3, 2013

(54) PHOTOCURABLE ACRYLIC VISCOELASTIC MATERIAL COMPOSITION, ACRYLIC VISCOELASTIC MATERIAL, ACRYLIC VISCOELASTIC MATERIAL LAYER TAPE OR SHEET AND PROCEED FOR PRODUCING THE SAME

(75) Inventors: Akira Hirao, Ibaraki (JP); Kunio Nagasaki, Ibaraki (JP); Kazuhisa Maeda, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 972 days.

This patent is subject to a terminal disclaimer.

(21) Appl. No.: 12/357,875

(22) Filed: Jan. 22, 2009

(65) Prior Publication Data

US 2009/0186164 A1 Jul. 23, 2009

(30) Foreign Application Priority Data

Jan. 22, 2008 (JP) ................................. 2008-011045

(51) Int. Cl.
  *C08J 3/28* (2006.01)
  *C08F 2/46* (2006.01)
  *B32B 7/12* (2006.01)
  *B32B 7/14* (2006.01)

(52) U.S. Cl.
  USPC ............... 522/116; 522/90; 522/96; 522/104; 522/107; 522/113; 522/114; 522/153; 522/150; 522/173; 522/174; 522/178; 522/182; 428/355 R; 428/355 EN; 428/355 AC; 428/355 N; 427/508; 427/516

(58) Field of Classification Search
  USPC ............ 522/90, 96, 104, 107, 113, 114, 116, 522/153, 150, 173, 174, 178, 182; 428/355 R, 355 EN, 355 AC, 355 N; 427/508, 516
  See application file for complete search history.

(56) References Cited

U.S. PATENT DOCUMENTS

| | | | | |
|---|---|---|---|---|
| 6,225,194 | B1 * | 5/2001 | Noguchi et al. | 438/464 |
| 7,910,206 | B2 * | 3/2011 | Kiuchi et al. | 428/354 |
| 2006/0082002 | A1 | 4/2006 | Arai et al. | |
| 2006/0257651 | A1 * | 11/2006 | Shintani et al. | 428/355 AC |
| 2006/0287408 | A1 | 12/2006 | Baikerikar et al. | |
| 2007/0059521 | A1 * | 3/2007 | Nakamura | 428/355 AC |
| 2008/0131634 | A1 * | 6/2008 | Kiuchi et al. | 428/34.9 |
| 2010/0316828 | A1 | 12/2010 | Baikerikar et al. | |
| 2011/0003135 | A1 * | 1/2011 | Hirao et al. | 428/313.3 |

FOREIGN PATENT DOCUMENTS

| | | |
|---|---|---|
| CN | 1825572 A | 8/2006 |
| EP | 1022625 A1 | 7/2000 |
| EP | 1724106 A1 | 11/2006 |
| EP | 1921120 A1 | 5/2008 |
| JP | 57-17030 B2 | 4/1982 |
| JP | 58-2371 A | 1/1983 |
| JP | 63-89582 A | 4/1988 |
| JP | 64-66280 A | 3/1989 |
| JP | 1-217092 A | 8/1989 |
| JP | 2-248483 A | 10/1990 |
| JP | 03-35075 A | 2/1991 |
| JP | 3-126784 A | 5/1991 |
| JP | 5-32946 A | 2/1993 |
| JP | 5-247410 A | 9/1993 |
| JP | 7-48549 A | 2/1995 |
| JP | 7-278500 A | 10/1995 |
| JP | 8-109356 A | 4/1996 |
| JP | 8-120230 A | 5/1996 |
| JP | 9-286958 A | 11/1997 |
| JP | 2000-109779 A | 4/2000 |
| JP | 2001-107005 A | 4/2001 |
| JP | 2002-180013 A | 6/2002 |
| JP | 2003-49130 A | 2/2003 |
| JP | 2003-192721 A | 7/2003 |
| JP | 2004-189767 A | 7/2004 |
| JP | 2005-263963 A | 9/2005 |
| JP | 2006-22189 A | 1/2006 |
| JP | 2008088408 A * | 4/2008 |
| WO | 2007/149125 A1 | 12/2007 |
| WO | WO 2008029768 A1 * | 3/2008 |

OTHER PUBLICATIONS

Ciba IRGACURE 651 product data sheet (2001_. [online]. [retrieved on Nov. 16, 2011]. Retrieved from internt:<URL:http://people.rit.edu/deeemc/courses/0305-676/reference/Imprint/irgacure_651.pdf>.*

Ciba IRGACURE 184 product data sheet (2001). [online]. [Retrieved on Nov. 16, 2011]. Retrieved from the internet: <URL:http://www.xtgchem.cn/upload/20110629045332.PDF>.*

(Continued)

Primary Examiner — Sanza McClendon
(74) Attorney, Agent, or Firm — Sughrue Mion, PLLC

(57) ABSTRACT

The present invention relates to a photocurable acrylic viscoelastic material composition including: an acrylic monomer mixture containing an alkyl (meth)acrylate as a main monomer component and a polar group-containing vinyl monomer, or a partial polymerization product thereof; a (meth)acrylate compound having at least one isocyanate group within the molecule thereof; and a photopolymerization initiator. The photocurable acrylic viscoelastic material composition of the present invention has, by virtue of the above-described construction, excellent pot life and excellent storage stability, despite containing an isocyanate compound having at least one isocyanate group within the molecule thereof, and further can form an acrylic viscoelastic material excellent in the holding power at high temperatures through photocuring. Also, the acrylic viscoelastic material and acrylic viscoelastic material layer tape or sheet of the present invention is excellent in the holding power at high temperatures.

13 Claims, No Drawings

(56) References Cited

OTHER PUBLICATIONS

Norsocryl Isobora and Isoborma. product data sheet from Arkema. [online]. [retreived on Nov. 16, 2011]. Retreived from the internet: <URL:http://www.arkema.com/sites/group/en/products/detailed_sheets/acrylics/norsocryl/our_products/speciality_monomers/aliphatic_monomers/isobora_isoborma.page>.*
Extended European Search Report dated May 6, 2009.
Chinese Office Action, dated Jun. 23, 2011, issued in Application No. 200910008426.0.
Chinese Office Action issued Dec. 7, 2011 by the State Intellectual Property of P.R. China in counterpart Chinese Patent Application No. 200910008426.0.
International Search Report for PCT/JP2007/067413 dated Oct. 23, 2007 [PCT/ISA/210].
Communication dated Dec. 21, 2011, issued by the State Intellectual Property Office of the People's Republic of China in Chinese Application No. 200780032659.3.
Office Action dated Jun. 12, 2012, issued by the Japanese Patent Office in Japanese Application No. 2007-203706.
Office Action dated Nov. 9, 2012, issued by the Japanese Patent Office in Japanese Application No. 2007-203706.
Office Action dated Mar. 20, 2013, issued by the United States Patent and Trademark Office in U.S. Appl. No. 12/439,931.

\* cited by examiner

PHOTOCURABLE ACRYLIC VISCOELASTIC MATERIAL COMPOSITION, ACRYLIC VISCOELASTIC MATERIAL, ACRYLIC VISCOELASTIC MATERIAL LAYER TAPE OR SHEET AND PROCEED FOR PRODUCING THE SAME

FIELD OF THE INVENTION

The present invention relates to a photocurable acrylic viscoelastic material composition containing an isocyanate compound, and an acrylic viscoelastic material which is formed from the photocurable acrylic viscoelastic material composition. More specifically, the present invention relates to a photocurable acrylic viscoelastic material composition containing an isocyanate compound, which has excellent storage stability before curing; an acrylic viscoelastic material which is formed from the photocurable acrylic viscoelastic material composition, which is excellent in the holding power at high temperatures; an acrylic viscoelastic material layer tape or sheet having an acrylic viscoelastic material layer comprising the acrylic viscoelastic material; and production methods thereof.

BACKGROUND OF THE INVENTION

Conventionally, in the production of a solvent-type pressure-sensitive adhesive, addition of a compound having a polyfunctional isocyanate group or incorporation of an isocyanate group-containing acrylic copolymer is generally known as a method for raising the cohesive force of a pressure-sensitive adhesive and obtaining an excellent pressure-sensitive adhesive property (see, JP-A-2005-263963, JP-A-2002-180013 and JP-A-2003-49130).

However, the solvent-type pressure-sensitive adhesive having added thereto a compound containing a polyfunctional isocyanate group or the solvent-type pressure-sensitive adhesive having incorporated thereinto an isocyanate group-containing acrylic copolymer has a problem that the pot life is very short and the storage stability is poor.

SUMMARY OF THE INVENTION

Accordingly, an object of the present invention is to provide an acrylic viscoelastic material composition having excellent pot life and excellent storage stability, despite containing an isocyanate compound having at least one isocyanate group within the molecule thereof, and being capable of forming an acrylic viscoelastic material excellent in the holding power at high temperatures.

Another object of the present invention is to provide an acrylic viscoelastic material excellent in the holding power at high temperatures, and an acrylic viscoelastic material layer tape or sheet containing the acrylic viscoelastic material.

As a result of intensive studies to solve those problems, the present inventors have found that a photocurable acrylic viscoelastic material composition including an acrylic monomer mixture containing an alkyl (meth)acrylate as a main monomer component and a polar group-containing vinyl monomer, or a partial polymerization product thereof, a (meth)acrylate compound having at least one isocyanate group within the molecule thereof, and a photopolymerization initiator has excellent pot life and excellent storage stability, despite containing an isocyanate compound having at least one isocyanate group within the molecule thereof, and when the photocurable acrylic viscoelastic material composition is photocured, an acrylic viscoelastic material excellent in the holding power at high temperatures can be obtained. The present invention has been accomplished based on this finding.

Namely, the present invention relates to the following items (1) to (14).

(1) A photocurable acrylic viscoelastic material composition including:

an acrylic monomer mixture containing an alkyl (meth)acrylate as a main monomer component and a polar group-containing vinyl monomer, or a partial polymerization product thereof;

a (meth)acrylate compound having at least one isocyanate group within the molecule thereof; and a photopolymerization initiator.

(2) The photocurable acrylic viscoelastic material composition according to (1), in which the acrylic monomer mixture or the partial polymerization product thereof includes 1 to 30 wt % of the polar group-containing vinyl monomer, based on the total amount of monomer components constituting the acrylic monomer mixture or the partial polymerization product thereof.

(3) The photocurable acrylic viscoelastic material composition according to (1) or (2), which includes 0.05 to 3 parts by weight of the (meth)acrylate compound having at least one isocyanate group within the molecule thereof, based on 100 parts by weight of all monomer components in the acrylic monomer mixture or the partial polymerization product thereof.

(4) The photocurable acrylic viscoelastic material composition according to any one of (1) to (3), in which the (meth)acrylate compound having at least one isocyanate group within the molecule thereof is 2-acryloyloxyethyl isocyanate.

(5) The photocurable acrylic viscoelastic material composition according to any one of (1) to (4), in which an acrylic viscoelastic material obtained by photocuring the photocurable acrylic viscoelastic material composition has an insoluble fraction of 30 to 90%.

(6) The photocurable acrylic viscoelastic material composition according to any one of (1) to (5), which is an acrylic pressure-sensitive adhesive composition forming an acrylic pressure-sensitive adhesive.

(7) An acrylic viscoelastic material obtained by photocuring the photocurable acrylic viscoelastic material composition according to any one of (1) to (6).

(8) An acrylic viscoelastic material layer tape or sheet having an acrylic viscoelastic material layer including the acrylic viscoelastic material according to (7).

(9) An acrylic pressure-sensitive adhesive tape or sheet having an acrylic pressure-sensitive adhesive layer including the acrylic pressure-sensitive adhesive obtained by photocuring the photocurable acrylic viscoelastic material composition according to (6).

(10) A process for producing an acrylic viscoelastic material, the process including photocuring the photocurable acrylic viscoelastic material composition according to any one of (1) to (6).

(11) A process for producing an acrylic viscoelastic material layer tape or sheet, the process including photocuring a layer including the photocurable acrylic viscoelastic material composition according to any one of (1) to (5) to thereby obtain an acrylic viscoelastic material layer.

(12) The process for producing an acrylic viscoelastic material layer tape or sheet according to (11), the process including:

forming the layer including the photocurable acrylic viscoelastic material composition on at least one surface of a substrate; and photocuring the layer by irradiating thereon an ultraviolet ray having an intensity of 1 to 30 mW/cm² at a wavelength of 300 to 400 nm while blocking oxygen to thereby obtain an acrylic viscoelastic material layer.

(13) A process for producing an acrylic pressure-sensitive adhesive tape or sheet, the process including photocuring a layer including the photocurable acrylic viscoelastic material composition according to (6) to thereby obtain an acrylic pressure-sensitive adhesive layer.

(14) The process for producing an acrylic pressure-sensitive adhesive tape or sheet according to (13), the process including:

forming the layer including the photocurable acrylic viscoelastic material composition on at least one surface of a substrate; and photocuring the layer by irradiating thereon an ultraviolet ray having an intensity of 1 to 30 mW/cm² at a wavelength of 300 to 400 nm while blocking oxygen to thereby obtain an acrylic pressure-sensitive adhesive layer.

The term "(meth)acrylate" indicates either one or both of an "acrylate" and a "methacrylate". Also, the "tape or sheet" is sometimes simply referred to as a "tape" or a "sheet".

The photocurable acrylic viscoelastic material composition of the present invention has, by virtue of the above-described construction, excellent pot life and excellent storage stability, despite containing an isocyanate compound having at least one isocyanate group within the molecule thereof, and further can form an acrylic viscoelastic material excellent in the holding power at high temperatures through photocuring. Also, the acrylic viscoelastic material and acrylic viscoelastic material layer tape or sheet of the present invention is excellent in the holding power at high temperatures.

DETAILED DESCRIPTION OF THE INVENTION

Photocurable acrylic viscoelastic material composition

The photocurable acrylic viscoelastic material composition is a photocurable (photopolymerizable) composition including an acrylic monomer mixture containing an alkyl (meth)acrylate as a main monomer component and a polar group-containing vinyl monomer, or a partial polymerization product thereof, a (meth)acrylate compound having at least one isocyanate group within the molecule thereof, and a photopolymerization initiator. The photocurable acrylic viscoelastic material composition has good pot life and excellent storage stability, despite containing a compound having an isocyanate group. Also, by curing the photocurable acrylic viscoelastic material composition with an active energy ray, an acrylic viscoelastic material excellent in the holding power particularly under a high-temperature environment (for example, under an atmosphere of 60 to 90° C.) can be formed.

The acrylic monomer mixture or a partial polymerization product thereof contains at least an alkyl(meth)acrylate as a main monomer component and a polar group-containing vinyl monomer as a copolymerizable monomer.

Examples of the alkyl(meth)acrylate include an ester of an acrylic or methacrylic acid containing a linear or branched alkyl group having a carbon number of 1 to 20 (preferably from 1 to 18, more preferably from 1 to 14), such as methyl group, ethyl group, propyl group, butyl group, amyl group, hexyl group, heptyl group, 2-ethylhexyl group, isooctyl group, isononyl group, isodecyl group, dodecyl group, lauryl group, tridecyl group, tetradecyl group, pentadecyl group, hexadecyl group, heptadecyl group, octadecyl group, nonadecyl group and eicosyl group. That is, the alkyl(meth)acrylate includes an alkyl (meth)acrylate containing a linear or branched alkyl group having a carbon number of 1 to 20 (preferably from 1 to 18, more preferably from 1 to 14). One kind or two or more kinds of these alkyl(meth)acrylates are used.

The amount of the alkyl(meth)acrylate in the acrylic monomer mixture or a partial polymerization product thereof is from 70 to 99 wt % (preferably from 90 to 98 wt %) based on the total amount of monomer components constituting the acrylic monomer mixture or a partial polymerization product thereof Examples of the polar group-containing vinyl monomer include a carboxyl group-containing monomer such as (meth)acrylic acid, carboxyethyl(meth)acrylate, carboxypentyl (meth)acrylate, itaconic acid, maleic acid, fumaric acid and crotonic acid; an acid anhydride monomer such as maleic anhydride and itaconic anhydride; a hydroxyl group-containing monomer such as 2-hydroxyethyl (meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl (meth)acrylate and (4-hydroxymethyl cyclohexyl)methyl (meth)acrylate; a sulfonic acid group-containing monomer such as styrenesulfonic acid, allylsulfonic acid, 2-(meth) acrylamido-2-methylpropane sulfonic acid, (meth)acrylamidopropanesulfonic acid, sulfopropyl(meth)acrylate and (meth)acryloyloxy naphthalenesulfonic acid; a phosphoric acid group-containing monomer such as 2-hydroxyethylacryloyl phosphate; an amide-based monomer such as (meth)acrylamide, N-methylolacrylamide and acryloylmorpholine; a succinimide-based monomer such as N-(meth) acryloyloxymethylene succinimide, N-(meth)acryloyl-6-oxyhexamethylenesuccinimide and N-(meth)acryloyl-8-oxyoctamethylenesuccinimide; and an acrylic acid ester-based monomer such as acrylonitrile, methacrylonitrile, glycidyl(meth)acrylate, tetrahydrofurfuryl(meth)acrylate, polyethylene glycol(meth)acrylate, polypropylene glycol (meth)acrylate, fluoro(meth)acrylate, silicone(meth)acrylate, 2-methoxyethyl acrylate and alicyclic hydrocarbon group-containing (meth)acrylic acid ester (e.g., cyclopentyl (meth)acrylate, cyclohexyl(meth)acrylate, isobornyl(meth) acrylate).

Incidentally, the polar group-containing vinyl monomer is preferably a polar group-containing vinyl monomer except for a hydroxyl group-containing monomer, because when a hydroxyl group-containing monomer is used as the polar group-containing monomer, deterioration readily occurs at high temperatures.

The amount of the polar group-containing vinyl monomer in the acrylic monomer mixture or a partial polymerization product thereof is 1 to 30 wt % (preferably 2 to 10 wt %) based on the total amount of monomer components constituting the acrylic monomer mixture or a partial polymerization product thereof If the content of the polar group-containing vinyl monomer exceeds 30 wt %, this may adversely affect the viscoelastic performance (particularly, tackiness) of the acrylic viscoelastic material, whereas if it is less than 1 wt %, the cohesive force of the acrylic viscoelastic material may decrease.

In the acrylic monomer mixture or a partial polymerization product thereof, a copolymerizable monomer other than the polar group-containing vinyl monomer may be contained. These copolymerizable monomers may be used alone or in combination thereof.

Such a copolymerizable monomer includes, for example, a polyfunctional monomer. Examples of the polyfunctional monomer include hexanediol di(meth)acrylate, (poly)ethylene glycol di(meth)acrylate, (poly)propylene glycol di(meth)

acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxy acrylate, polyester acrylate, urethane acrylate, dibutyl di(meth)acrylate and hexyl di(meth)acrylate.

In the case of using a polyfunctional monomer as a copolymerizable monomer in the acrylic monomer mixture or a partial polymerization product thereof, the amount thereof is 0.01 to 2 wt %, preferably 0.02 to 1 wt %, based on the total amount of monomer components constituting the acrylic monomer mixture or a partial polymerization product thereof. If the amount of the copolymerizable monomer exceeds 2 wt % based on the total amount of monomer components, the cohesive force of the acrylic viscoelastic material becomes too high and an excessively hard acrylic viscoelastic material may result. Also, if it is less than 0.01 wt % based on the total amount of monomer components, the cohesive force of the elastomer decreases and an excessively sticky surface results to make the handling difficult.

Examples of the copolymerizable monomer other than the polar group-containing vinyl monomer and polyfunctional monomer include vinyl esters such as vinyl acetate and vinyl propionate; aromatic vinyl compounds such as styrene and vinyltoluene; olefins or dienes such as ethylene, butadiene, isoprene and isobutylene; vinyl ethers such as vinyl alkyl ether; vinyl chloride; a (meth)acrylic acid alkoxyalkyl-based monomer such as methoxyethyl(meth)acrylate and ethoxyethyl(meth)acrylate; a sulfonic acid group-containing monomer such as sodium vinylsulfonate; a phosphoric acid group-containing monomer such as 2-hydroxyethylacryloyl phosphate; an imide group-containing monomers such as cyclohexylmaleimide and isopropylmaleimide; an isocyanate group-containing monomer such as 2-methacryloyloxyethyl isocyanate; a fluorine atom-containing (meth)acrylate; and a silicon atom-containing (meth)acrylate.

The (meth)acrylate compound having at least one isocyanate group within the molecule thereof is not particularly limited as long as it is a chain structure having one group selected from an acryl group and a methacryl group at one end and having an isocyanate group at another end. Examples thereof include 2-methacryloyloxyethyl isocyanate ("Karenz MOI", trade name, produced by Showa Denko K.K.), 2-acryloyloxyethyl isocyanate ("Karenz AOI", trade name, produced by Showa Denko K.K.) and methacryloyloxyethyl isocyanate ethyl ether ("Karenz MOI E G", trade name, produced by Showa Denko K.K.).

Above all, the (meth)acrylate compound having at least one isocyanate group within the molecule thereof is preferably an acrylate compound having at least one isocyanate group within the molecule thereof, because a methacrylate compound having at least one isocyanate group within the molecule thereof may cause reduction in the polymerization rate and in turn, the viscoelastic performance (particularly, tackiness) or productivity of the acrylic viscoelastic material may decrease.

Specifically, 2-acryloyloxyethyl isocyanate is suitably used.

The content of the (meth)acrylate compound having at least one isocyanate group within the molecule thereof varies depending on the kind or amount used of the polar group-containing vinyl monomer but is not particularly limited and may be selected from a range of 0.05 to 3 parts by weight (preferably from 0.2 to 2 parts by weight) based on 100 parts by weight of all monomer components in the acrylic monomer mixture or a partial polymerization product thereof.

When the (meth)acrylate compound having at least one isocyanate group within the molecule thereof is used in this range, the acrylic viscoelastic material can maintain excellent viscoelasticity (particularly adhesive strength) and holding property and can be enhanced in the cohesive force even under a high-temperature environment. Incidentally, if the content is less than 0.05 parts by weight, sufficiently high cohesive force may not be obtained under a high-temperature environment, whereas if it exceeds 3 parts by weight, the crosslinking density becomes high and the viscoelasticity (particularly adhesive strength) of the acrylic viscoelastic material may decrease.

The (meth)acrylate compound having at least one isocyanate group within the molecule thereof may be used alone or in combination thereof The photopolymerization initiator is not particularly limited, and examples of the photopolymerization initiator which can be used include an α-hydroxyketone-based photopolymerization initiator, α-aminoketone photopolymerization initiator, acylphosphine oxide-based photopolymerization initiator, a benzoin ether-based photopolymerization initiator, an acetophenone-based photopolymerization initiator, an α-ketol-based photopolymerization initiator, an aromatic sulfonyl chloride-based photopolymerization initiator, an photoactive oxime-based photopolymerization initiator, a benzoin-based photopolymerization initiator, a benzyl-based photopolymerization initiator, a benzophenone-based photopolymerization initiator, a ketal-based photopolymerization initiator and a thioxanthone-based photopolymerization initiator. These photopolymerization initiators may be used alone or in combination thereof Specifically, examples of the α-hydroxyketone-based photopolymerization initiator include 1-hydroxy-cyclohexyl-phenyl ketone ("Irgacure 184", trade name, produced by Ciba Specialty Chemicals Corp.), 2-hydroxy-2-methyl-1-phenyl-propan-1-one ("Darocure 1173", trade name, produced by Ciba Specialty Chemicals Corp.) and 1-[4-(2-hydroxy-ethoxy)-phenyl]-2-hydroxy-2-methyl-1-propan-1-one ("Irgacure 2959", trade name, produced by Ciba Specialty Chemicals Corp.). Examples of the α-aminoketone photopolymerization initiator include 2-methyl-1-[4-(methylthio)phenyl]-2-morpholinopropan-1-one ("Irgacure 907", trade name, produced by Ciba Specialty Chemicals Corp.) and 2-benzyl-2-dimethylamino-1-(4-morpholinophenyl)-butanone-1 ("Irgacure 369", trade name, produced by Ciba Specialty Chemicals Corp.). Examples of the acylphosphine oxide-based photopolymerization initiator include 2,4,6-trimethylbenzoylphenylphosphine oxide ("Lucirin TPO", trade name, produced by BASF) and bis(2,4,6-trimethylbenzoyl)-phenylphosphine oxide ("Irgacure 819", trade name, produced by Ciba Specialty Chemicals Corp.). Examples of the benzoin ether-based photopolymerization initiator include benzoin methyl ether, benzoin ethyl ether, benzoin propyl ether, benzoin isopropyl ether, benzoin isobutyl ether, 2,2-dimethoxy-1,2-diphenylethan-1-one and anisole methyl ether. Examples of the acetophenone-based photopolymerization initiator include 2,2-diethoxyacetophenone, 2,2-dimethoxy-2-phenylacetophenone, 1-hydroxycyclohexyl phenyl ketone, 4-phenoxydichloroacetophenone, 4-tert-butyl-dichloroacetophenone and 4-(2-hydroxyethoxy)phenyl (2-hydroxy-2-propyl) ketone ("Darocure 2959", trade name, produced by Ciba Specialty Chemicals Corp.). Examples of the α-ketol-based photopolymerization initiator include 2-methyl-2-hydroxypropiophenone and 1-[4-(2-hydroxy-ethyl)-phenyl]-2-hydroxy-2-methylpropane-1-one.

Examples of the aromatic sulfonyl chloride-based photopolymerization initiator include 2-naphthalenesulfonyl chloride. Examples of the photoactive oxime-based photopolymerization initiator include 1-phenyl-1,1-propanedione-2-(o-ethoxycarbonyl)-oxime. Examples of the benzoin-based photopolymerization initiator include benzoin. Examples of the benzyl-based photopolymerization initiator include benzil. Examples of the benzophenone-based photopolymerization initiator include benzophenone, benzoylbenzoic acid, 3,3'-dimethyl-4-methoxybenzophenone, polyvinyl benzophenone and α-hydroxycyclohexyl phenyl ketone. Examples of the ketal-based photopolymerization initiator include benzyl dimethyl ketal and 2,2-dimethoxy-1,2-diphenylethan-1-one ("Irgacure 651", trade name, produced by Ciba Specialty Chemicals Corp.). Examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone and dodecylthioxanthone.

The amount of the photopolymerization initiator used is not particularly limited but, for example, may be selected from a range of 0.01 to 5 parts by weight (preferably 0.05 to 3 parts by weight) based on 100 parts by weight of all monomer components in the acrylic monomer mixture or a partial polymerization product thereof.

The photocurable acrylic viscoelastic material composition forms an acrylic viscoelastic material by photocuring (photopolymerization) upon irradiation with an active energy ray. Examples of the active energy ray include ionizing radiation such as α ray, β ray, γ ray, neutron ray and electron beam, and an ultraviolet ray. In particular, an ultraviolet is suitable. Incidentally, the irradiation energy, irradiation time, irradiation method and the like of the active energy ray are not particularly limited as long as the photocurable acrylic viscoelastic material composition can be cured to form an acrylic viscoelastic material.

In curing the photocurable acrylic viscoelastic material composition to form an acrylic viscoelastic material, photopolymerization and thermal polymerization may be used in combination. Examples of the thermal polymerization initiator include an azo-based polymerization initiator (e.g., 2,2'-azobisisobutyronitrile, 2,2'-azobis-2-methylbutyronitrile, dimethyl 2,2'-azobis(2-methylpropionate), 4,4'-azobis-4-cyanovaleric acid, azobisisovaleronitrile, 2,2'-azobis(2-amidinopropane)dihydrochloride, 2,2'-azobis[2-(5-methyl-2-imidazolin-2-yl)propane]dihydrochloride, 2,2'-azobis(2-methylpropionamidine)disulfate, 2,2'-azobis(N,N'-dimethyleneisobutyramidine)dihydro chloride), a peroxide-based polymerization initiator (e.g., tert-hexylperoxy-2-ethylhexanoate ("Perhexyl O", trade name, produced by NOF Corp.), benzoyl peroxide, tert-butyl permaleate), and a redox-type polymerization initiator (for example, a combination such as organic peroxide/vanadium compound, organic peroxide/dimethylaniline, and naphthenic acid metal salt/butyl aldehyde, aniline or acetylbutyrolactone). The amount of the thermal polymerization initiator used is not particularly limited and may be sufficient if it is in a range allowing utilization as a thermal polymerization initiator. Incidentally, when a redox-type polymerization initiator is used as the thermal polymerization initiator, polymerization at ordinary temperature is possible.

In the photocurable acrylic viscoelastic material composition, according to the necessity, an appropriate additive may be contained in the range not inhibiting the photopolymerizability. Examples of the additive include a surfactant (e.g., ionic surfactant, silicone-containing surfactant, fluorine-containing surfactant), a crosslinking agent (e.g., polyisocyanate-based crosslinking agent, silicone-based crosslinking agent, epoxy-based crosslinking agent, alkyletherified melamine-based crosslinking agent), a tackifier (for example, a tackifier which is solid, semi-so lid or liquid at ordinary temperature and comprises a rosin derivative resin, a polyterpene resin, a petroleum resin or a phenolic resin), a plasticizer, a filler, an anti-aging agent, an antioxidant and a colorant (e.g., pigment, dye).

The photocurable acrylic viscoelastic material composition can be prepared by uniformly mixing and dispersing the above-described components. This photocurable acrylic viscoelastic material composition is usually shaped like a sheet by coating it on a substrate and therefore, preferably has an appropriate viscosity suitable for the coating operation. The viscosity of the photocurable acrylic viscoelastic material composition can be adjusted, for example, by blending various polymers such as acrylic rubber, polyurethane and thickening additive, or by polymerizing a part of monomer components in the photocurable acrylic viscoelastic material composition by light irradiation or the like. That is, the photocurable acrylic viscoelastic material composition may be a partially polymerized composition (partial polymerization product, monomer syrup) which is enhanced in the viscosity by previously polymerizing a part of monomer components. The viscosity is preferably 5 to 50 Pa·s, more preferably 10 to 40 Pa·s, in terms of a viscosity set by using a BH viscometer under the conditions of rotor: No. 5 rotor, rotation number: 10 rpm and measurement temperature: 30° C. If the viscosity is less than 5 Pa·s, the liquid flows off when coated on a substrate, whereas if it exceeds 50 Pa·s, coating becomes difficult due to excessively high viscosity.

At the coating of the photocurable acrylic viscoelastic material composition, for example, a commonly employed coater (e.g., comma roll coater, die roll coater, gravure roll coater, reverse roll coater, kiss roll coater, dip roll coater, bar coater, knife coater, spray coater) may be used.

The photocurable acrylic viscoelastic material composition can form a photocurable acrylic viscoelastic material composition layer when coated, for example, on a predetermined surface of a substrate, a release film or the like by the commonly employed coater described above and can further form an acrylic viscoelastic material layer when the photocurable acrylic viscoelastic material composition layer is irradiated with an active energy ray and thereby photocured.

Also, the photocurable acrylic viscoelastic material composition may be a photocurable acrylic pressure-sensitive adhesive composition including an acrylic monomer mixture containing an alkyl(meth)acrylate as a main monomer component and a polar group-containing vinyl monomer, or a partial polymerization product thereof, a (meth)acrylate compound having at least one isocyanate group within the molecule thereof, and a photopolymerization initiator. The photocurable acrylic pressure-sensitive adhesive composition that is a photocurable acrylic viscoelastic material composition can form a photocurable acrylic pressure-sensitive adhesive composition layer when coated, for example, on a predetermined surface of a substrate, a release film or the like by the commonly employed coater described above and can further form an acrylic pressure-sensitive adhesive layer when the photocurable acrylic pressure-sensitive adhesive composition layer is irradiated with an active energy ray and thereby photocured.

When the photocurable acrylic viscoelastic material composition as such a photocurable acrylic pressure-sensitive adhesive composition is used, an acrylic pressure-sensitive adhesive excellent in the holding power at high temperatures can be obtained.

Acrylic Viscoelastic Material

The acrylic viscoelastic material is obtained by photocuring the above-described photocurable acrylic viscoelastic material composition including an acrylic monomer mixture containing an alkyl(meth)acrylate as a main monomer component and a polar group-containing vinyl monomer, or a partial polymerization product thereof, a (meth)acrylate compound having at least one isocyanate group within the molecule thereof, and a photopolymerization initiator, and has excellent holding power under a high-temperature environment (for example, under an atmosphere at 60 to 90° C.).

Such an acrylic viscoelastic material preferably has an insoluble fraction (gel fraction) of 30 to 90 wt % (more preferably from 40 to 85 wt %). If the insoluble fraction is less than 30 wt %, the cohesive force decreases and this may cause reduction in the holding power or the like under a high-temperature environment, whereas if it exceeds 90 wt %, the modulus of elasticity becomes high and the pressure-sensitive adhesive force may decrease.

The insoluble fraction (gel fraction) is determined by weighing the acrylic viscoelastic material, charging it into ethyl acetate, taking out only the insoluble content after standing at 23° C. for one or more weeks, drying and removing the solvent contained in the insoluble content, weighing the residue, and substituting the weighed values to the following formula:

Insoluble fraction (wt %)=weight of insoluble content/initial weight×100

The acrylic viscoelastic material is obtained by photocuring the above-described photocurable acrylic viscoelastic material composition, but the amount of a radical generated by a photopolymerization initiator varies depending on the kind or intensity of light (active energy ray) irradiated, irradiation time, monomer, and amount of dissolved oxygen in the photocurable acrylic viscoelastic material composition. Therefore, if the amount of dissolved oxygen is large, generation of a radical may be suppressed to result in insufficient progress of polymerization and allow containing many unreacted products and this may adversely affect the conversion, molecular weight and molecular weight distribution of the obtained polymer. To avoid such a trouble, at the production of the acrylic viscoelastic material, oxygen is preferably replaced with nitrogen by blowing an inert gas such as nitrogen into the photocurable acrylic viscoelastic material composition before light irradiation. For example, in the case where the photocurable acrylic viscoelastic material composition is photocured using an active energy ray in an inert gas atmosphere such as nitrogen gas, oxygen is preferably present as little as possible in the inert gas atmosphere and, for example, the oxygen concentration is preferably 5,000 ppm or less.

The acrylic viscoelastic material layer including an acrylic viscoelastic material is produced by coating the photocurable acrylic viscoelastic material composition on a predetermined surface of a substrate, a release film or the like to form a photocurable acrylic viscoelastic material composition layer, and irradiating an active energy ray on the photocurable acrylic viscoelastic material composition layer to photocure the layer. At the time of photocuring the photocurable acrylic viscoelastic material composition layer by irradiating an active energy ray thereon, the layer is preferably covered with a release film (separator) to block oxygen.

The release film is not particularly limited as long as it is a thin leafy body that hardly allows permeation of oxygen, but in the case of using a photopolymerization reaction, a transparent film is preferred. For example, a commonly employed release paper may be used as such a release film. Specific examples of the release film which can be used include a substrate having on at least one surface a release-treated layer (peel-treated layer) by a release treating agent (peel treating agent), a low-adhesive substrate formed of a fluorine-based polymer (for example, polytetrafluoroethylene, polychlorotrifluoroethylene, polyvinyl fluoride, polyvinylidene fluoride, a tetrafluoroethylene/hexafluoropropylene copolymer or a chlorofluoroethylene/vinylidene fluoride copolymer), and a low-adhesive substrate formed of a nonpolar polymer (for example, an olefin-based resin such as polyethylene and polypropylene). Incidentally, in the case of a low-adhesive substrate, both surfaces may be used as a release surface, and in the case of a substrate having a release-treated layer, the release-treated layer surface can be used as a release surface (release-treated surface).

As regards the release film, for example, a release film in which a release-treated layer is formed on at least one surface of a release film substrate (a substrate having a release-treated layer) may be used, or a release film substrate may be used as it is.

Examples of the release film substrate include a plastic substrate film (synthetic resin film) such as polyester film (e.g., polyethylene terephthalate film), olefin-based resin film (e.g., polyethylene film, polypropylene film), polyvinyl chloride film, polyimide film, polyamide film (e.g., nylon film) and rayon film; paper (e.g., woodfree paper, Japanese paper, kraft paper, glassine paper, synthetic paper, top-coated paper); and a multi-layered (two- or three-layered) composite fabricated by lamination, co-extrusion or the like. As for the release film substrate, a release film substrate using a plastic substrate film (particularly polyethylene terephthalate film) having high transparency may be suitably used.

The release treating agent is not particularly limited and, for example, a silicone-based release treating agent, a fluorine-based release treating agent, or a long-chain alkyl-based release treating agent may be used. The release treating agent may be used alone or in combination thereof. The release film which is release-treated with a release treating agent is formed, for example, by a conventional forming method.

The thickness of the release film is not particularly limited but, in view of easy handleability and profitability, the thickness may be selected, for example, from a range of 12 to 250 μm (preferably 20 to 200 μm). The release film may have either a single-layer form or a multilayer form.

The active energy ray includes the above-described active energy rays. The irradiation energy and irradiation time of the active energy ray are not particularly limited and may be sufficient if the photopolymerization initiator can be activated to cause a reaction of monomer components.

Specific examples of the irradiation of an active energy ray include irradiation of an ultraviolet ray. The intensity of the ultraviolet ray is, in terms of intensity at a wavelength of 300 to 400 nm, 1 to 30 mW/cm$^2$, preferably 3 to 10 mW/cm$^2$. If the intensity of the ultraviolet ray exceeds 30 mW/cm$^2$, the molecular weight of the produced viscoelastic material (polymer) is reduced due to the effect of heat of polymerization and sufficient viscoelasticity (particularly pressure-sensitive adhesive property) may not be obtained, whereas if it is less than 1 mW/cm$^2$, the ultraviolet ray must be irradiated for a very long time until obtaining a viscoelastic material and this is not preferred.

As for the light source used in the irradiation of an ultraviolet ray, a light source having a spectrum distribution in the wavelength region of 180 to 460 nm (preferably 300 to 400 nm) is used and, for example, a general irradiation device such as chemical lamp, blacklight (manufactured by Toshiba Lighting & Technology Corp.), mercury arc, carbon arc, low-pressure mercury lamp, medium-pressure mercury lamp, high-pressure mercury lamp, ultrahigh-pressure mercury lamp and metal halide lamp may be used. Incidentally, an irradiation device capable of generating electromagnetic radiation at a wavelength shorter or longer than the wavelength above may also be used.

The illuminance of the ultraviolet ray can be set to desired illuminance, for example, by adjusting the distance from the irradiation device as a light source to the photocurable acrylic viscoelastic material composition or photocurable acrylic viscoelastic material composition layer or the voltage.

The photocurable acrylic viscoelastic material layer may be an acrylic pressure-sensitive adhesive layer formed by curing a photocurable acrylic pressure-sensitive adhesive composition which is the photocurable acrylic viscoelastic material composition.

The adhesive force (pressure-sensitive adhesive performance) of the acrylic pressure-sensitive adhesive layer can be adjusted by appropriately selecting, for example, the components of the photocurable acrylic pressure-sensitive adhesive composition, the irradiation method of an active energy ray at the production of the pressure-sensitive adhesive layer, or the thickness of the acrylic pressure-sensitive adhesive layer.

Specific examples of the method for adjusting the adhesive force by appropriately selecting the irradiation method of an active energy ray include the method described in JP-A-2003-13015. In JP-A-2003-13015, a method of irradiating an active energy in parts through a plurality of stages and thereby more precisely adjusting the pressure-sensitive adhesive performance is disclosed. Specifically, in the case of using an ultraviolet ray as the active energy ray, examples of the method include a method of performing the ultraviolet irradiation in parts through a first stage of performing light irradiation at an illuminance of 30 mW/cm$^2$ or more and a second stage of performing light irradiation at an illuminance lower than that in the first stage to substantially complete the polymerization reaction; and a method of performing the ultraviolet irradiation in parts through a first stage of performing light irradiation at an illuminance of 30 mW/cm$^2$ or more, a second stage of performing light irradiation at an illuminance lower than that in the first stage to reach a conversion of at least 70%, and a third stage of performing light irradiation at an illuminance of 30 mW/cm$^2$ or more to substantially complete the polymerization reaction.

As for the ultraviolet irradiation device, for example, a low-pressure mercury lamp, a high-pressure mercury lamp, an ultrahigh-pressure mercury lamp or a metal halide lamp is used in the first step, and, for example, a chemical lamp or a blacklight is used in the second stage.

The thickness of the acrylic viscoelastic material layer (acrylic pressure-sensitive adhesive layer) is not particularly limited, but when the necessary pressure-sensitive adhesive property or the thickness required of a part (member) fabricated using the acrylic viscoelastic material is taken into consideration, the thickness is, for example, from 10 to 300 µm, preferably on the order of 20 to 100 µm. Incidentally, the acrylic viscoelastic material layer may have a single-layer structure or a multilayer structure.

Furthermore, when the acrylic viscoelastic material layer is provided on a substrate or a release film, an acrylic viscoelastic material layer tape or sheet (sometimes referred to as an "acrylic viscoelastic material layer sheet") can be obtained. That is, the acrylic viscoelastic material layer sheet has one or more acrylic viscoelastic material layers each composed of an acrylic viscoelastic material.

Such an acrylic viscoelastic material layer sheet may be a sheet with a substrate or a substrate-less sheet. Also, both surfaces may be an acrylic viscoelastic material layer surface (double-faced type) or only one surface may be an acrylic viscoelastic material layer surface (single-faced type).

In the case where the acrylic viscoelastic material layer sheet is a sheet with a substrate, an appropriate thin leafy body may be used as the substrate, and examples thereof include a paper substrate such as paper; a fibrous substrate such as cloth, nonwoven fabric and net; a metallic substrate such as metal foil and metal sheet; a plastic substrate such as plastic film or sheet; a rubber-based substrate such as rubber sheet; a foam such as foam sheet; and a laminate thereof (in particular, a laminate of a plastic substrate with another substrate, or a laminate of plastic films or sheets with each other). The substrate which can be suitably used is a plastic substrate such as plastic film or sheet. Examples of the material for such a plastic substrate include an olefin-based resin containing an α-olefin as a monomer component, such as polyethylene (PE), polypropylene (PP), ethylene-propylene copolymer and ethylene-vinyl acetate copolymer (EVA); a polyester such as polyethylene terephthalate (PET), polyethylene naphthalate (PEN) and polybutylene terephthalate (PBT); polyvinyl chloride (PVC); polyphenylene sulfide (PPS); an amide-based resin such as polyamide (nylon) and wholly aromatic polyamide (aramid); and polyether ether ketone (PEEK). Incidentally, when a plastic substrate is used as the substrate, the deformability such as elongation percentage may be controlled by a stretching treatment or the like.

The thickness of the substrate may be appropriately selected according to the strength, flexibility, intended use or the like and, for example, the thickness is generally 1,000 µm or less (for example, from 1 to 1,000 µm), preferably from 1 to 500 µm, more preferably on the order of 3 to 300 µm.

In order to increase the adherence to the acrylic viscoelastic material layer, the surface of the substrate may be subjected to a commonly employed surface treatment, for example, an oxidation treatment by a chemical or physical method, such as treatment with chromic acid, exposure to ozone, exposure to flame, exposure to high-voltage electric shock and treatment with ionizing radiation, or may be subjected to a coating treatment with a coating agent such as anchor coating agent, primer or adhesive.

In the case where the acrylic viscoelastic material layer is an acrylic pressure-sensitive adhesive layer, the acrylic viscoelastic material layer sheet may be an acrylic pressure-sensitive adhesive sheet. This pressure-sensitive adhesive sheet may take any form of a double-faced pressure-sensitive adhesive sheet where both surfaces are a pressure-sensitive adhesive surface by the acrylic pressure-sensitive adhesive layer; a double-faced pressure-sensitive adhesive sheet where one surface is a pressure-sensitive adhesive surface by the acrylic pressure-sensitive adhesive layer and another surface is by other pressure-sensitive adhesive layer; and a single-faced pressure-sensitive adhesive sheet where only one surface is a pressure-sensitive adhesive surface by the acrylic pressure-sensitive adhesive layer.

Examples of the other pressure-sensitive adhesive forming the other pressure-sensitive adhesive layer include conventional adhesives (pressure-sensitive adhesives) (e.g., acrylic pressure-sensitive adhesive, rubber-based pressure-sensitive adhesive, vinyl alkyl ether-based pressure-sensitive adhesive, silicone-based pressure-sensitive adhesive, polyester-based pressure-sensitive adhesive, polyamide-based pressure-sensitive adhesive, urethane-based pressure-sensitive adhesive, fluorine-based pressure-sensitive adhesive, epoxy-based pressure-sensitive adhesive).

The acrylic viscoelastic material layer sheet may have other layers (e.g., intermediate layer, undercoat layer) within the range not impairing the effects of the present invention.

Also, the acrylic viscoelastic material layer sheet may be formed in a state of being wound into a roll or a state of the sheets being stacked. That is, the acrylic viscoelastic material layer sheet may have a form such as sheet or tape. Incidentally, the acrylic viscoelastic material layer sheet in a state or form of being wound into a roll may be in a state or form where the sheet is wound into a roll while protecting the surface of the acrylic viscoelastic material layer by a separator or where the sheet is wound into a roll while protecting the surface of the acrylic viscoelastic material layer by a release-treated layer (back-treated layer) formed on another surface of the support. Examples of the release treating agent (release agent) used when forming a release-treated layer (back-treated layer) on a surface of the support include a silicone-based release agent and a long-chain alkyl-based release agent.

The acrylic viscoelastic material layer sheet or acrylic pressure-sensitive adhesive sheet can be obtained, for example, by forming a layer of the photocurable acrylic viscoelastic material composition or acrylic pressure-sensitive adhesive composition on at least one surface of a substrate and irradiating the layer with an ultraviolet ray having an intensity of 1 to 30 mW/cm$^2$ at a wavelength of 300 to 400 nm while blocking oxygen to form an acrylic viscoelastic material layer or acrylic pressure-sensitive adhesive layer.

The acrylic viscoelastic material layer sheet (acrylic pressure-sensitive adhesive sheet) with the acrylic viscoelastic material layer being an acrylic pressure-sensitive adhesive layer has an acrylic pressure-sensitive adhesive layer which is the acrylic viscoelastic material layer excellent in the holding power at high temperatures, and therefore, this sheet can be used as pressure-sensitive adhesive sheets in the form of a sheet or a tape. Furthermore, this pressure-sensitive adhesive sheet exhibits excellent adhesive strength also at low temperatures (for example, at about 0° C.).

When the method of forming an acrylic viscoelastic material by the photopolymerization of the photocurable acrylic viscoelastic material composition is used, a high-molecular-weight acrylic viscoelastic material can be easily obtained by controlling the irradiation intensity, irradiation time and the like of the active energy ray used. At the same time, since the gel fraction is saturated in the early stage, a curing time for crosslinking is not required, and an acrylic viscoelastic material can be obtained substantially without using an environmental load substance such as organic solvent.

EXAMPLES

The present invention is described below based on Examples, but the present invention is not limited to these Examples by any means.

Example 1

After adding 0.05 parts by weight of 2,2-dimethoxy-1,2-diphenylethan-1-one (photoinitiator, "Irgacure 651", trade name, produced by Ciba Specialty Chemicals Corp.) and 0.05 parts by weight of 1-hydroxy-cyclohexyl-phenyl-ketone (photoinitiator, "Irgacure 184", trade name, produced by Ciba Specialty Chemicals Corp.) to a monomer mixture containing 95 parts by weight of 2-ethylhexyl acrylate (2EHA) and 5 parts by weight of an acrylic acid (AA) as the polar group-containing monomer, the blend was charged into a four-neck flask and exposed to an ultraviolet ray in a nitrogen atmosphere to partially effect photopolymerization, whereby a monomer syrup (partial polymerization product) in a conversion of 7% was obtained. This monomer syrup contained a prepolymer having a molecular weight (Mw) of 5,000,000.

Subsequently, 0.08 parts by weight of 2-acryloyloxyethyl isocyanate ("Karenz AOI", trade name, produced by Showa Denko K.K.) was uniformly mixed in 100 parts by weight of the monomer syrup, and the mixture was subjected to a defoaming treatment to prepare a photopolymerizable composition (photocurable composition).

After 24 hours from the preparation of the photopolymerizable composition, the photopolymerizable composition was coated on a substrate film ("MRF-38", trade name, produced by Mitsubishi Polyester Film Corp., thickness: 38 μm, a polyester film) to have a thickness of 50 μm after photocuring, thereby forming a polymerizable composition layer, and a release film [a polyester film with one surface being release-treated with a silicon-based release treating agent ("MRN-38", trade name, produced by Mitsubishi Polyester Film Corp.)] was provided on the polymerizable composition layer to obtain a sheet.

An ultraviolet ray (UV) at an illuminance of 5 mW/cm was irradiated on both surfaces of the sheet above by using a blacklight lamp (manufactured by Toshiba Corp.) for a time long enough to reach a conversion of 99%, so as to photocure the polymerizable composition layer and form a viscoelastic material layer, whereby a viscoelastic material layer sheet was obtained.

Incidentally, the illuminance of the ultraviolet ray was adjusted using an ultraviolet intensity meter ("UVRT-1", trade name, manufactured by Topcon Technohouse Corp., maximum wavelength at peak sensitivity: 350 nm).

Example 2

A viscoelastic material layer sheet was obtained by forming a viscoelastic material layer in the same manner as in Example 1 except that the amount of 2-acryloyloxyethyl isocyanate ("Karenz AOI", trade name, produced by Showa Denko K.K.) mixed was changed to 0.10 parts by weight.

Example 3

A viscoelastic material layer sheet was obtained by forming a viscoelastic material layer in the same manner as in Example 1 except that the amount of 2-acryloyloxyethyl isocyanate ("Karenz AOI", trade name, produced by Showa Denko K.K.) mixed was changed to 0.15 parts by weight.

Example 4

A viscoelastic material layer sheet was obtained by forming a viscoelastic material layer in the same manner as in Example 1 except that a monomer syrup (partial polymerization product) in a conversion of 7% was obtained using a monomer mixture containing 90 parts by weight of 2-ethylhexyl acrylate (2EHA) and 10 parts by weight of an acrylic acid (AA) as the polar group-containing monomer and the amount of 2-acryloyloxyethyl isocyanate ("Karenz AOI", trade name, produced by Showa Denko K.K.) mixed was changed to 0.05 parts by weight.

The monomer syrup above contained a prepolymer having a molecular weight (Mw) of 5,000,000.

Example 5

A viscoelastic material layer sheet was obtained by forming a viscoelastic material layer in the same manner as in Example 4 except that the amount of 2-acryloyloxyethyl isocyanate ("Karenz AOI", trade name, produced by Showa Denko K.K.) mixed was changed to 0.08 parts by weight and 0.1 parts by weight of 2,2-dimethoxy-1,2-diphenylethan-1-one (photoinitiator, "Irgacure 651", trade name, produced by Ciba Specialty Chemicals Corp.) was further added to the monomer syrup.

Example 6

A viscoelastic material layer sheet was obtained by forming a viscoelastic material layer in the same manner as in Example 4 except that 0.5 parts by weight of 2,2-dimethoxy-1,2-diphenylethan-1-one (photoinitiator, "Irgacure 651", trade name, produced by Ciba Specialty Chemicals Corp.) was further added to the monomer syrup.

Example 7

A viscoelastic material layer sheet was obtained by forming a viscoelastic material layer in the same manner as in Example 1 except that 0.08 parts by weight of 2-methacryloyloxyethyl isocyanate ("Karenz MOI", trade name, produced by Showa Denko K.K.) was mixed in place of 0.08 parts by weight of 2-acryloyloxyethyl isocyanate ("Karenz AOI", trade name, produced by Showa Denko K.K.).

Comparative Example 1

A viscoelastic material layer sheet was obtained by forming a viscoelastic material layer in the same manner as in Example 1 except that the amount of 2-acryloyloxyethyl isocyanate ("Karenz AOI", trade name, produced by Showa Denko K.K.) mixed was changed to 0.03 parts by weight.

Comparative Example 2

A viscoelastic material layer sheet was obtained by forming a viscoelastic material layer in the same manner as in Example 1 except that 1.0 parts by weight of hydroxyethyl acrylate ("Acrics HEA", trade name, produced by Toagosei Co., Ltd.) was further added to the monomer mixture.

Comparative Example 3

A viscoelastic material layer sheet was obtained by forming a viscoelastic material layer in the same manner as in Example 1 except that 1.0 parts by weight of an isocyanate-based crosslinking agent ("Coronate L", trade name, produced by Nippon Polyurethane Industry Co., Ltd.) was mixed in place of 0.08 parts by weight of 2-acryloyloxyethyl isocyanate ("Karenz AOI", trade name, produced by Showa Denko K.K.).

Comparative Example 4

A viscoelastic material layer sheet was obtained by forming a viscoelastic material layer in the same manner as in Example 1 except that 1.0 parts by weight of an isocyanate-based crosslinking agent ("Coronate HX", trade name, produced by Nippon Polyurethane Industry Co., Ltd.) was mixed in place of 0.08 parts by weight of 2-acryloyloxyethyl isocyanate ("Karenz AOI", trade name, produced by Showa Denko K.K.).

Comparative Example 5

A viscoelastic material layer sheet was obtained by forming a viscoelastic material layer in the same manner as in Example 4 except that 1.0 parts by weight of an isocyanate-based crosslinking agent ("Coronate L", trade name, produced by Nippon Polyurethane Industry Co., Ltd.) was mixed in place of 0.05 parts by weight of 2-acryloyloxyethyl isocyanate ("Karenz AOI", trade name, produced by Showa Denko K.K.).

Comparative Example 6

A viscoelastic material layer sheet was obtained by forming a viscoelastic material layer in the same manner as in Example 4 except that 1.0 parts by weight of an isocyanate-based crosslinking agent ("Coronate HX", trade name, produced by Nippon Polyurethane Industry Co., Ltd.) was mixed in place of 0.05 parts by weight of 2-acryloyloxyethyl isocyanate ("Karenz AOI", trade name, produced by Showa Denko K.K.).

Comparative Example 7

A viscoelastic material layer sheet was obtained by forming a viscoelastic material layer in the same manner as in Example 1 except that 1.0 parts by weight of xylylene diisocyanate (XDI) ("Takenate", trade name, produced by Takeda Chemical Industries, Ltd.) was mixed in place of 0.08 parts by weight of 2-acryloyloxyethyl isocyanate ("Karenz AOI", trade name, produced by Showa Denko K.K.).

Comparative Example 8

A viscoelastic material layer sheet was obtained by forming a viscoelastic material layer in the same manner as in Example 1 except that 0.08 parts by weight of 1,6-hexanediol acrylate ("NK Ester A-HD", trade name, produced by Shin-Nakamura Chemical Co., Ltd.) was mixed in place of 0.08 parts by weight of 2-acryloyloxyethyl isocyanate ("Karenz AOI", trade name, produced by Showa Denko K.K.).

Comparative Example 9

A viscoelastic material layer sheet was obtained by forming a viscoelastic material layer in the same manner as in Example 5 except that 0.08 parts by weight of 1,6-hexanediol acrylate ("NK Ester A-HD", trade name, produced by Shin-Nakamura Chemical Co., Ltd.) was mixed in place of 0.08 parts by weight of 2-acryloyloxyethyl isocyanate ("Karenz AOI", trade name, produced by Showa Denko K.K.).

Comparative Example 10

A viscoelastic material layer sheet was obtained by forming a viscoelastic material layer in the same manner as in Example 6 except that 0.08 parts by weight of 1,6-hexanediol acrylate ("NK Ester A-HD", trade name, produced by Shin-Nakamura Chemical Co., Ltd.) was mixed in place of 0.05 parts by weight of 2-acryloyloxyethyl isocyanate ("Karenz AOI", trade name, produced by Showa Denko K.K.).

Evaluations

With respect to Examples and Comparative Examples, the pot life (storage stability) and high-temperature creep property were evaluated by the "Evaluation Method of Pot Life" and "Evaluation Method of High-Temperature Creep Property" below. Also, the insoluble fraction (gel fraction), normal-temperature adhesive force and low-temperature adhesive force were measured by the "Measuring Method of Gel Fraction", "Measuring Method of Normal-Temperature Adhesive Force" and "Measuring Method of Low-Temperature Adhesive Force" below. The results obtained are shown together in Tables 3 and 4.

Evaluation Method of Pot Life

The component B in Table 1 below was blended with the monomer mixture (Component A in Table 1) in each of Examples and Comparative Examples in a ratio shown in Tables 1 and 2 below to prepare a mixture for measurement of pot life.

Incidentally, the component B and the ratio of the component B are 2-acryloyloxyethyl isocyanate ("Karenz AOI", trade name, produced by Showa Denko K.K.), 2-methacryloyloxyethyl isocyanate ("Karenz MOI", trade name, produced by Showa Denko K.K.), an isocyanate-based crosslinking agent, xylylene diisocyanate (XDI) ("Takenate", trade name, produced by Takeda Chemical Industries, Ltd.), or 1,6-hexanediol acrylate ("NK Ester A-HD", trade name, produced by Shin-Nakamura Chemical Co., Ltd.), and the ratio thereof in corresponding Examples and Comparative Examples.

The pot life (storage stability) was evaluated by whether or not the mixture for measurement of pot life can be uniformly coated on a separator ("MRF-38", trade name, produced by Mitsubishi Polyester Film Corp.), based on the following criteria.

A: The mixture could be evenly and uniformly coated even when using a mixture for measurement of pot life stored at ordinary temperature (25° C.) for 24 hours after preparation.

B: The mixture could be evenly and uniformly coated when using a mixture for measurement of pot life stored at ordinary temperature for 10 hours after preparation but could not be evenly and uniformly coated when using a mixture for measurement of pot life stored at ordinary temperature for 24 hours after preparation.

C: The mixture could be evenly and uniformly coated when using a mixture for measurement of pot life stored at ordinary temperature for 5 hours after preparation but could not be evenly and uniformly coated when using a mixture for measurement of pot life stored at ordinary temperature for 10 hours after preparation.

D: The mixture could not be evenly and uniformly coated even when using a mixture for measurement of pot life stored at ordinary temperature for 1 hour after preparation.

In Tables 1 and 2, "2EHA" means "2-ethylhexyl acrylate", "AA" means "acrylic acid, "HEA" means "hydroxyethyl acrylate", "AOI" means "2-acryloyloxyethyl isocyanate ("Karenz AOI", trade name, produced by Showa Denko K.K.)", "MOI" means "2-methacryloyloxyethyl isocyanate ("Karenz MOI", trade name, produced by Showa Denko K.K.)", "C/L" means "isocyanate-based crosslinking agent ("Coronate L", trade name, produced by Nippon Polyurethane Industry Co., Ltd.)", "C/HX" means "isocyanate-based crosslinking agent ("Coronate HX", trade name, produced by Nippon Polyurethane Industry Co., Ltd.)", "XDI" means "xylylene diisocyanate", and "HDDA" means "1,6-hexanediol acrylate".

Evaluation Method of High-Temperature Creep Property

The viscoelastic material layer of Examples and Comparative Examples was laminated to a 50 μm-thick polyethylene terephthalate (PET) film to produce a test specimen (width: 10 mm, length: 100 mm).

The test specimen was laminated to the bottom end on one surface of a test plate (bakelite plate, "TAIKOLITE FL-102", produced by Futamura Chemical Co., Ltd.) cleaned with toluene, to give an adhesion area of width: 10 mm and length: 20 mm and press-bonded by one-way pass of a 5-kg roller over the test specimen.

Thereafter, the laminate was left standing at room temperature (25° C.) for 24 hours, further aged in an atmosphere of 80° C. and after aging, left standing for 2 hours under a load of 500 g in an atmosphere of 80° C.

After passing of 2 hours, when the test specimen did not slide down, the dislocated distance (dislocation distance) was measured, and when slid down, this was rated "fall".

Measurement Method of Insoluble Fraction

The viscoelastic material layer of Examples and Comparative Examples was sampled, the sample was precisely weighed, and the weight was designated as $W_0$ (dry weight). After the sample was dipped in ethyl acetate for 7 days in an atmosphere of 23° C., the sample was taken out, dried at 130° C. for 2 hours and then precisely weighed, and this weight was designated as $W_1$. From these weights, the insoluble fraction was calculated according to the following formula:

$$\text{Insoluble fraction (\%)} = (W_1/W_0) \times 100$$

Measuring Method of Normal-Temperature Adhesive Force

The sheet of Examples and Comparative Examples, after processing into a width of 25 mm, was press-bonded to an SUS plate in an atmosphere of 25° C. in the form of the viscoelastic material layer contacting with the SUS plate surface under the condition of one-way pass of a 5-kg roller over the sheet and then aged at 25° C. for 30 minutes to obtain a sample for measurement.

TABLE 1

|  |  | Example | | | | | | |
| --- | --- | --- | --- | --- | --- | --- | --- | --- |
|  |  | 1 | 2 | 3 | 4 | 5 | 6 | 7 |
| Component A | 2EHA | 95 | 95 | 95 | 90 | 90 | 90 | 95 |
|  | AA | 5 | 5 | 5 | 10 | 10 | 10 | 5 |
|  | HEA |  |  |  |  |  |  |  |
| Component B | AOI | 0.08 | 0.10 | 0.15 | 0.05 | 0.08 | 0.05 |  |
|  | MOI |  |  |  |  |  |  | 0.08 |

TABLE 2

|  |  | Comparative Example | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| Component A | 2EHA | 95 | 95 | 95 | 95 | 90 | 90 | 95 | 95 | 90 | 90 |
|  | AA | 5 | 5 | 5 | 5 | 10 | 10 | 5 | 5 | 10 | 10 |
|  | HEA |  |  | 1 |  |  |  |  |  |  |  |
| Component B | AOI | 0.03 | 0.08 |  |  |  |  |  |  |  |  |
|  | C/L |  |  | 1.0 |  | 1.0 |  |  |  |  |  |
|  | C/HX |  |  |  | 1.0 |  | 1.0 |  |  |  |  |
|  | XDI |  |  |  |  |  |  | 1.0 |  |  |  |
|  | HDDA |  |  |  |  |  |  |  | 0.08 | 0.08 | 0.08 |

The sample for measurement was peeled off in the 180° peel direction at a tensile rate of 50 mm/min in an atmosphere of 25° C. by using a tensile tester ("TECHNO GRAPH TG-1kN", trade mark, manufactured by Minebea Co., Ltd.), whereby the 180° peel adhesive force (180° peel adhesive strength) as normal-temperature adhesive force was measured.

Measuring Method of Low-Temperature Adhesive Force

The sheet of Examples and Comparative Examples, after processing into a width of 25 mm, was press-bonded to an SUS plate in an atmosphere of 0° C. in the form of the viscoelastic material layer contacting with the SUS plate surface under the condition of one-way pass of a 5-kg roller over the sheet and then aged at 0° C. for 30 minutes to obtain a sample for measurement.

The sample for measurement was peeled off in the 180° peel direction at a tensile rate of 50 mm/min in an atmosphere of 0° C. by using a tensile tester ("AG-1kNG", trade mark, manufactured by Shimadzu Corp.), whereby the 180° peel adhesive force (180° peel adhesive strength) as low-temperature adhesive force was measured.

TABLE 3

|  | Example | | | | | | |
|---|---|---|---|---|---|---|---|
|  | 1 | 2 | 3 | 4 | 5 | 6 | 7 |
| Insoluble fraction [%] | 66.3 | 74.3 | 83.3 | 51.0 | 58.0 | 58.4 | 58.4 |
| Pot life | A | A | A | A | A | A | A |
| High-temperature creep property: Dislocated distance [mm] | 0.7 | 0.5 | 0.3 | 0.7 | 0.8 | 0.8 | 2.0 |
| Normal-temperature adhesive force [N/25 mm] | 9.8 | 9.2 | 8.5 | 13.0 | 10.7 | 13.0 | 9.1 |
| Low-temperature adhesive force [N/25 mm] | 12.2 | 10.4 | 9.4 | 16.6 | 13.6 | 15.8 | 11.0 |

TABLE 4

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| Insoluble fraction [%] | 32.0 | — | — | — | — | — | — | 70.8 | 63.5 | 70.3 |
| Pot life | A | A | C | D | D | D | D | A | A | A |
| High-temperature creep property: Dislocated distance [mm] | 2.5 | 0.5 | — | — | — | — | — | 0.7 | fall | fall |
| Normal-temperature adhesive force [N/25 mm] | 11.8 | — | — | — | — | — | — | 9.0 | 10.0 | 11.0 |
| Low-temperature adhesive force [N/25 mm] | 13.3 | — | — | — | — | — | — | 10.3 | 11.2 | 13.0 |

In Table 4, "–" indicates that the measurement could not be performed.

When the viscoelastic material layer of Comparative Example 2 was heated at 100° C. or more, deterioration of the viscoelastic material was observed.

While the present invention has been described in detail and with reference to specific embodiments thereof, it will be apparent to one skilled in the art that various changes and modifications can be made therein without departing from the scope thereof.

This application is based on Japanese patent application No. 2008-011045 filed Jan. 22, 2008, the entire contents thereof being hereby incorporated by reference.

Further, all references cited herein are incorporated in their entireties.

What is claimed is:

1. A photocurable acrylic viscoelastic material composition comprising:
   an acrylic monomer mixture containing an alkyl (meth) acrylate as a main monomer component and a polar group-containing vinyl monomer, or a partial polymerization product thereof;
   a (meth)acrylate compound having at least one isocyanate group within the molecule thereof; and
   a photopolymerization initiator;
   wherein the amount of the alkyl (meth)acrylate in the acrylic monomer mixture or a partial polymerization product thereof is from 70 to 99 wt % based on the total amount of monomer components constituting the acrylic monomer mixture or a partial polymerization product thereof; and
   wherein the amount of the (meth)acrylate compound having at least one isocyanate group within the molecule thereof is 0.05 to 3 parts by weight based on 100 parts by weight of all monomer components in the acrylic monomer mixture or the partial polymerization product thereof.

2. The photocurable acrylic viscoelastic material composition according to claim 1, wherein the acrylic monomer mixture or the partial polymerization product thereof comprises 1 to 30 wt % of the polar group-containing vinyl monomer, based on the total amount of monomer components constituting the acrylic monomer mixture or the partial polymerization product thereof.

3. The photocurable acrylic viscoelastic material composition according to claim 1, wherein the (meth)acrylate compound having at least one isocyanate group within the molecule thereof is 2-acryloyloxyethyl isocyanate.

4. The photocurable acrylic viscoelastic material composition according to claim 1, wherein an acrylic viscoelastic material obtained by photocuring the photocurable acrylic viscoelastic material composition has an insoluble fraction of 30 to 90%.

5. The photocurable acrylic viscoelastic material composition according to claim 1, which is an acrylic pressure-sensitive adhesive composition forming an acrylic pressure-sensitive adhesive.

6. An acrylic viscoelastic material obtained by photocuring the photocurable acrylic viscoelastic material composition according to claim 1.

7. An acrylic viscoelastic material layer tape or sheet having an acrylic viscoelastic material layer comprising the acrylic viscoelastic material according to claim 6.

8. An acrylic pressure-sensitive adhesive tape or sheet having an acrylic pressure-sensitive adhesive layer comprising the acrylic pressure-sensitive adhesive obtained by photocuring the photocurable acrylic viscoelastic material composition according to claim 5.

9. A process for producing an acrylic viscoelastic material, said process comprising photocuring the photocurable acrylic viscoelastic material composition according to claim 1.

10. A process for producing an acrylic viscoelastic material layer tape or sheet, said process comprising photocuring a layer comprising the photocurable acrylic viscoelastic material composition according to claim 1 to thereby obtain an acrylic viscoelastic material layer.

11. The process for producing an acrylic viscoelastic material layer tape or sheet according to claim 10, said process comprising:
    forming the layer comprising the photocurable acrylic viscoelastic material composition on at least one surface of a substrate; and
    photocuring said layer by irradiating thereon an ultraviolet ray having an intensity of 1 to 30 mW/cm$^2$ at a wavelength of 300 to 400 nm while blocking oxygen to thereby obtain an acrylic viscoelastic material layer.

12. A process for producing an acrylic pressure-sensitive adhesive tape or sheet, said process comprising photocuring a layer comprising the photocurable acrylic viscoelastic material composition according to claim 5 to thereby obtain an acrylic pressure-sensitive adhesive layer.

13. The process for producing an acrylic pressure-sensitive adhesive tape or sheet according to claim 12, said process comprising:
    forming the layer comprising the photocurable acrylic viscoelastic material composition on at least one surface of a substrate; and
    photocuring said layer by irradiating thereon an ultraviolet ray having an intensity of 1 to 30 mW/cm$^2$ at a wavelength of 300 to 400 nm while blocking oxygen to thereby obtain an acrylic pressure-sensitive adhesive layer.

* * * * *